(12) United States Patent
Lim et al.

(10) Patent No.: US 10,554,237 B1
(45) Date of Patent: Feb. 4, 2020

(54) APPARATUS AND METHOD FOR ACCESSORY DETECTION IN A PORTABLE COMMUNICATION DEVICE

(71) Applicant: MOTOROLA SOLUTIONS, INC., Chicago, IL (US)

(72) Inventors: Yoke Peir Lim, Bayan Lepas (MY); Tzun Chuan Woo, Bayan Lepas (MY); Daniel Grobe Sachs, Elmhurst, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/448,151

(22) Filed: Jun. 21, 2019

(51) Int. Cl.
*H04B 1/38* (2015.01)
*H04B 1/3827* (2015.01)
*H01R 13/15* (2006.01)

(52) U.S. Cl.
CPC ........... *H04B 1/3827* (2013.01); *H01R 13/15* (2013.01)

(58) Field of Classification Search
CPC .......... G06F 13/24; G06F 13/38; G06F 13/40; G06F 13/42; G06F 13/385; G06F 13/4068; G06F 13/4282; G06F 2213/2424; G06F 2213/0042; G01N 27/06; G01N 27/048; G03B 17/08; H04N 5/225; H04N 5/232; H04N 5/23245; H04N 5/2257; H04N 5/232411; Y02D 10/151; Y02D 10/14; H01R 2107/00
USPC .......................................... 445/557; 324/414
See application file for complete search history.

(56) References Cited

U.S. PATENT DOCUMENTS

| | | | | |
|---|---|---|---|---|
| 2,289,202 | A | 7/1942 | McCoy | |
| 5,912,964 | A * | 6/1999 | Stelman | H04M 1/215 379/345 |
| 6,222,910 | B1 * | 4/2001 | Price | H04M 11/06 379/442 |
| 6,603,329 | B1 * | 8/2003 | Wang | H04L 25/0278 326/30 |
| 6,940,303 | B2 * | 9/2005 | Vargas | H03H 7/40 326/30 |
| 7,218,155 | B1 * | 5/2007 | Chang | H03K 19/0005 326/30 |
| 7,221,193 | B1 * | 5/2007 | Wang | H03K 19/0005 326/30 |
| 8,072,223 | B1 | 12/2011 | Sioma | |
| 8,102,679 | B2 * | 1/2012 | Gong | H02M 3/156 363/21.04 |
| 8,898,348 | B2 * | 11/2014 | Minoo | G06F 1/1632 320/107 |
| 9,178,413 | B2 * | 11/2015 | Huynh | H02M 1/4225 |

(Continued)

FOREIGN PATENT DOCUMENTS

EP         2390673 A2 * 11/2011   ......... H01R 13/6683
WO    WO-2017213796 A1 * 12/2017   ............... H02H 9/04

*Primary Examiner* — Mahendra R Patel
(74) *Attorney, Agent, or Firm* — Barbarra R. Doutre

(57) ABSTRACT

A portable battery operated communication device provides a device interface formed of a plurality of exposed device contacts including a live voltage contact and a GND contact. Electronic circuitry associated with the interface is configured to operate in a non-linear mode using a low leakage path in response to electrolytic contamination across the two contacts. The interface is further configured to operate in a linear mode using a low current path during accessory attachment. Accessory detection is provided by a non-linear impedance device and sensor.

17 Claims, 5 Drawing Sheets

(56) References Cited

U.S. PATENT DOCUMENTS

| | | | |
|---|---|---|---|
| 9,274,578 B2* | 3/2016 | Mullins | G06F 1/266 |
| 9,405,354 B2* | 8/2016 | Huang | G06F 1/3296 |
| 2014/0223037 A1* | 8/2014 | Minoo | G06F 1/1632 |
| | | | 710/16 |
| 2014/0247011 A1* | 9/2014 | Wijeratne | H01M 10/425 |
| | | | 320/112 |
| 2016/0006409 A1* | 1/2016 | Keane | H03H 7/465 |
| | | | 333/103 |
| 2017/0358922 A1* | 12/2017 | Bacon | H02H 9/04 |
| 2018/0181509 A1* | 6/2018 | Jo | H04N 5/23245 |

* cited by examiner

APPARATUS AND METHOD FOR ACCESSORY DETECTION IN A PORTABLE COMMUNICATION DEVICE

FIELD OF THE DISCLOSURE

The present disclosure relates generally to portable communication devices, and more particularly to a portable communication device providing an interface for accessory detection and mitigation of contact corrosion.

BACKGROUND

Portable battery-powered communication devices are advantageous in many environments, and particularly in public safety environments such as fire rescue, first responder, and mission-critical environments. Such devices are often used in conjunction with accessories that facilitate remote operation of one or more device features and/or additional features. The accessory is typically coupled to the portable communication device via a plurality of interface contacts. When the portable communication device is used without the accessory, these interface contacts may be exposed to undesirable environmental conditions. Exposure of the interface contacts to moisture, particularly salt water, can lead to contact corrosion and such contact corrosion can be problematic to reconnection of the accessory. Exposed interface contacts which feature a live voltage contact in proximity to a ground contact are particularly susceptible to corrosion causing unreliable connections that can potentially lead to communication failures and false triggers of accessory detection. Approaches used to address such issues need to be mindful of current drain.

Accordingly, there is a need for an apparatus and method which enables a portable communication device to provide an improved interface for accessory detection which addresses the issue of contact corrosion.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
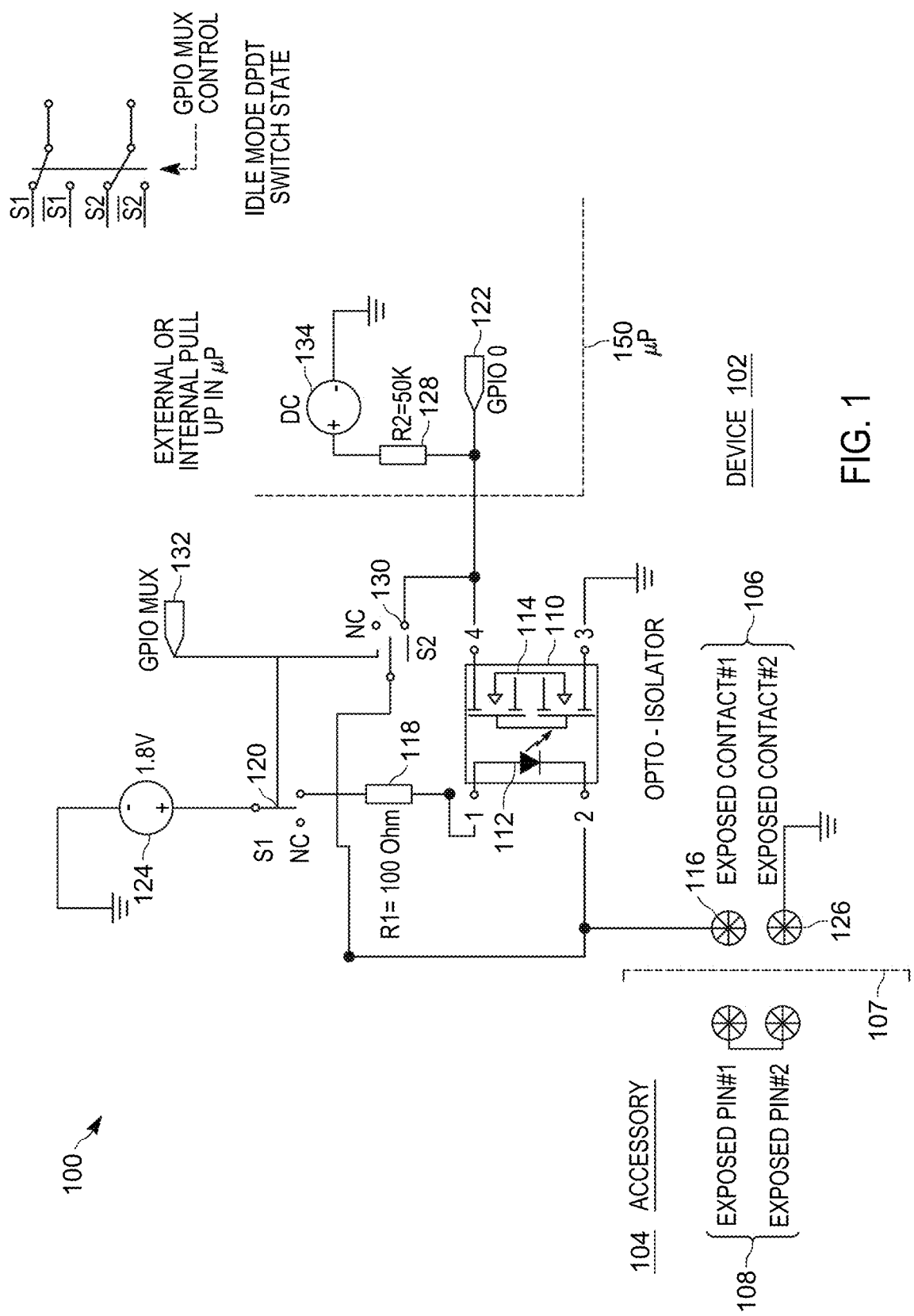
FIG. 1 is schematic diagram of a portable communication system that mitigates contact corrosion formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein an apparatus and method for a portable battery operated communication device to provide an improved interface for accessory detection and mitigation of contact corrosion. The portable battery operated communication device may comprise, for example, a two-way radio or other battery powered portable device, while the accessory may comprise a remote speaker microphone (RSM) or other accessory that interfaces with the portable device. The portable communication device advantageously incorporates both linear and non-linear circuitry comprising a low leakage path and a low current path. These different current paths are switchably enabled with the contact interface of the portable communication device. The low leakage path prevents contact corrosion which might otherwise arise when the portable communication device has no accessory attached to the contact interface, leaving device contacts exposed to the environment. The low current path maintains low current when the portable communication device has the accessory attached to the contact interface.

Portable battery operated communication devices having a live voltage contact proximately located to a low voltage contact will benefit from the apparatus and method provided herein. For example, a portable communication device having a global communications accessory interface (GCAI) wherein at least one live voltage contact is proximately located to a ground potential (GND) contact will benefit from the managed current paths which minimize current drain during accessory attachment, while preventing corrosion on the contacts when the accessory is not attached, and without requiring disabling of accessory detect at the communication device subsequent to accessory detachment. In other words, the accessory detect is advantageously able to remain enabled at the communication device subsequent to accessory detachment (which facilitates future detection of attachment) while avoiding contact corrosion.

FIG. 1 is schematic diagram of a portable communication system 100 formed and operating in accordance with some embodiments. The portable communication system 100 comprises a portable battery operated communication device 102 which can accommodate attachment to, and detachment from, an accessory 104. A plurality of device interface contacts 106 are located on the device side to align and mate with corresponding accessory pins 108 located on the accessory side. The device contacts and accessory pins may interface with each other via a connector interface 107, which may be a cabled connector-to-device, device-to-device, or other interface. The device interface contacts 106 of portable battery operated communication device 102 are left exposed when the accessory 104 is detached.

The plurality of device interface contacts 106 comprises at least two contacts 116, 126, one contact being a live contact 116 resistively coupled to a voltage potential such as 124 or 134, and the other contact being a GND contact 126, or other low voltage potential contact, wherein these contacts are proximately located to each other. For example, the two contacts 116, 126 of portable communication device 102 may comprise a sense contact adjacent to a GND contact or a non-GND, lower voltage potential contact for sensing accessory attachment in response to a short being applied across the device contacts by the accessory 104. Examples of a non-GND, lower potential contact might include, but are not limited to, a lower potential voltage generated by a resistor divider, or a lower voltage rail at second contact 126 (e.g. 1.8V) relative to a higher voltage rail at the live contact 116 (e.g. 3.3V). These lower voltage potentials may also be referred to as virtual GND. For the purposes of this application the second contact 126 may comprise a direct GND contact or a virtual GND contact.

In the past, voltage potential formed between proximately located contacts could cause migration of metal from a positive contact to a negative contact resulting in contact corrosion. For example, copper may have become exposed on a positive contact and black contaminant may have formed at a negative contact. Such contact corrosion could lead to connectivity failures of an attached accessory. However, in accordance with the embodiments provided herein, the portable communication device 102 advantageously mitigates contact corrosion of exposed device contacts, allowing for improved accessory detection and reduced falsing of exposed contacts.

In accordance with some embodiments, the portable communication device 102 provides an improved interface though a non-ohmic approach that maintains sufficient resistance between exposed live contact 116 and GND contact 126 thereby reducing current therebetween that could otherwise cause corrosion and trigger false accessory detection. Hence, current which may occur as a result of a contamination solution, such as salt water or other electrolytic solution, across proximately located contacts 116, 126 is minimized, such that migration of ions across the metal contacts is insufficient to cause the formation of corrosion residue on the contacts.

The portable communication device 102 advantageously incorporates both linear and non-linear circuitry switching between a low leakage path during nonlinear operation and a low current path during linear operation. These different current paths are switchably enabled with the contact interface of the portable communication device 102. The low leakage path prevents contact corrosion which might otherwise arise when the portable communication device has no accessory attached to the contact interface, leaving device contacts exposed to the environment. The low current path maintains low current when the portable communication device 102 has the accessory 104 attached to the contact interface.

In accordance with some embodiments, the portable battery operated communication device 102 comprises a non-linear impedance device or circuit 110 that operates using a non-linear voltage-current characteristic curve along with reliable analog signals and general purpose input/output signals 122, 132 of a microprocessor 150. The non-linear impedance device 110 may comprise, for example, an opto-isolator, however other non-linear impedance devices operating in conjunction with a sensor may also be used. For the purposes of describing FIG. 1, the nonlinear device will be described in terms of the opto-isolator, and be referred to as opto-isolator 110. While described in terms of an integrated opto-isolator, it is to be appreciated that other integrated circuits or discrete devices having non-linear impedance used in conjunction with a sensor may be used instead. For example, a discrete op-amp superdiode and sensor, a discrete diode and sensor, a discrete LED and sensor, a discrete transistor and sensor, to name a few. The integrated opto-isolator is an attractive choice because of its integration of both the non-linear element and sensor element, in a size and cost well-suited to portable battery operated device applications.

The opto-isolator 110 is an electronic component that transfers electrical signals between two isolated circuits by using light. The opto-isolator 110 is formed of a light emitting diode (LED) 112, referred to as diode 112, and a sensor 114 (phototransistor) separated by a dielectric barrier in the center. The phototransistor 114 operates as a current probe by measuring light emitted by the diode 112. In accordance with some embodiments, a cathode of the diode 112 is coupled to exposed contact 116, and an anode of the diode 112 is coupled to a pull up resistor (R1) 118, via a first switch (S1) 120, to a DC voltage 124, for example 1.8 volts. The pull-up resistor 118 is selected to provide sufficient current to turn on diode 112 when accessory attachment is detected, via a short across contacts 116, 126. A low value resistance is preferably chosen for R1 118, for example 100 ohms, or other resistance value which allows for sufficient current to temporarily turn on the diode 112 with sufficient current to turn on the sensor 114. This initial high LED turn-on current is only utilized for a brief time as part of the detection of accessory attachment. With sensor 114 turned on, a logic level low is presented to an input port 122 (GPIO 0) of the microprocessor 150.

Microprocessor 150 is responsive to accessory attachment and detachment sensed at input port 122 and controls an output port (GPIO MUX) 132, in response thereto. Output port 132 controls first and second switches, shown as a first switch (S1) 120 and a second switch (S2BAR) 130. First switch (S1) 120 and second switch (S2BAR) 130 may be implemented, for example, as a double pole double throw switch. Input port 122 is also coupled to a second pull-up resistor (R2) 128 to another DC supply 134.

Operationally and as will be summarized in Table 1 to follow, the portable battery operated communication device 102 operates in an idle mode when no accessory is attached across contacts 116, 126, which maintains the input port 122 to the microprocessor 150 at a logic level high, provided by second pull-up resistor (R2) 128 to DC supply 134. The logic level high at input port 122 to microprocessor 150 causes the output port 132 to maintain the first switch (S1) 120 in a closed state and the second switch (S2BAR) 130 to remains in an open state. The first switch (S1) 120 being closed couples first pull up resistor (R1) 118 to the anode of diode 112—however no current is being pulled across the open contacts 116, 126. Hence, in idle mode, under open, non-contaminated contact conditions, no current will be drawn.

When an accessory is first attached to the portable communication device, the first and second contacts 116, 126 are shorted to GND which turns on diode 112 with high current flowing through the first switch (S1) 120 (still in closed state). For example, a current of greater than 1 mA may be drawn from DC voltage 124, through first switch (S1) 120, first pull up resistor (R1) 118, and diode 112. The current being drawn through diode 112 is sufficient to turn on sensor 114. Turning on sensor 114 results in a sufficiently low voltage drop across non-linear impedance device 110 to present a logic level low to the input port 122 (GPIO 0).

The input port (GPIO 0) 122 going low is detected by the microprocessor 150 as accessory attachment. The microprocessor 150 maintains the first switch (S1) 120 closed and the second switch (S2BAR) 130 open, for a brief predetermined period of time, to verify accessory attachment. After the predetermined time, in which the accessory has been detected and is still attached, the portable communication device advantageously switches to a low current path operating in a linear mode.

The switch to a low current path operating in a linear mode is controlled by the output port (GPIO MUX) 132 changing the states of the switches 120, 130, wherein the first switch (S1) 120 opens and the second switch (S2BAR) 130 closes. The low current path is thereby created from second pull-up resistor (R2) 128, through second switch (S2BAR) 130 through to shorted contacts 116, 126. The larger resistance (e.g. 50 k-ohm resistor) used for R2 128 provides for minimal current drain during this linear mode of operation. This arrangement further allows for detection of accessory detachment while drawing minimal current.

Upon initial removal of the accessory 104 from the portable communication device 102, the input port (GPIO 0) 122 goes high (via second pull-up resistor R2 128 to DC supply 134) as non-linear impedance device 110 shuts off. The microprocessor 150 maintains the output port (GPIO MUX) 132 to maintain the first switch (S1) 120 in an open state and the second switch (S2BAR) 130 in a closed state for a predetermined debounce time. After the predetermined debounce time, the high on input port 122 (GPIO 0) triggers the output port (GPIO MUX) 132 to change the state of the first and second switches, wherein the first switch (S1) 120 goes to a closed state and the second switch (S2BAR) 130 goes to an open state, returning the portable communication device 102 to idle mode.

When operating in idle mode (detached accessory condition/exposed contacts 116, 126), a low leakage path can be switch in response to environmental conditions causing salt water or other electrolytic solution to form across the proximately located exposed contacts 116, 126. The low leakage path is formed through DC supply 124, pull up resistor (R1) 120, and diode 112. The diode 112 forms a high impedance limiting current to GND. The low leakage path limits current to a few micro-amps (e.g. 6 micro-amps). False detection will not occur because the forward current across the diode 112 thru salt water on contacts 116 and 126 is insufficient to turn on the diode 112. Therefore, sensor 114 will not be activated, leaving input port 122 (GPIO 0) at a logic high (from second resistor (R2) to second DC supply 134). Hence, even with the presence of a contaminant occurring across the exposed contacts 116, 126, such as salt water or other electrolytic solution, the formation of corrosion residue is minimized.

Table 1 summarizes the operation of the communication system 100 in accordance with some embodiments.

TABLE 1

| CONNECT/ DISCONNECT | STATE | GPIO 0 | GPIO MUX S1 | S2BAR |
|---|---|---|---|---|
| CONNECTING ACCESSORY | NO ACCESSORY - IDLE STATE | HIGH | CLOSE | OPEN |
| | ACCESSORY ATTACHED | LOW | CLOSE | OPEN |
| | ACCESSORY STILL ATTACHED GPIO 0 HAND OVER FOR LOWER CURRENT | DEBOUNCE X-ms AFTER GPIO MUX CHANGES STATE FROM | OPEN | CLOSE |

TABLE 1-continued

| CONNECT/ DISCONNECT | STATE | GPIO 0 | GPIO MUX S1 | S2BAR |
|---|---|---|---|---|
| | CONSUMPTION WITHOUT RELYING ON SENSOR TO CONTINUE TO OPERATE. DIODE-ON CURRENT IS FEW MILLI AMPS | HIGH TO LOW | | |
| DISCONNECTING ACCCESSORY | REMOVING ACCESSORY | DEBOUNCE X-ms AFTER GPIO 0 CHANGES STATE FROM LOW TO HIGH | OPEN | CLOSE |
| | RETURN TO IDLE STATE - NO ACCESSORY | HIGH | CLOSE | OPEN |

Past ohmic detector approaches using conventional pull-up resistors cannot sufficiently limit current flowing across contaminated contacts nor sufficiently minimize corrosion without causing false detection. For example, depending on the type of liquid solution, a 10 k-ohm pull up resistor to 1.8 volts could have had a leakage current of tens to hundreds of micro-amps, (e.g. 128 micro-Amps). The approach provided by the embodiments allows for much lower leakage current on the order of a few micro-amps, advantageously providing for at least an order of magnitude less than prior approaches. Table 2 shows examples of various materials and the improvement in leakage current. Such improvement in leakage current minimizes migration of metal across the contacts from the live contact 116 to the GND contact 126, thereby minimizing corrosion.

TABLE 2

| Material Introduced on LED Pin 2 to GND Pin | Resistance on terminal 3-4 | Current through S1 path | Current through S2BAR path | Voltage Observed on Pin 2 |
|---|---|---|---|---|
| Sea Water | Open - no false detection | 6 uA | off | 0.95 V |
| Saturated Salt Water Solution | Open - no false detection | 6 uA | off | 0.9 V |
| Tap Water | Open - no false detection | 0.4 uA | off | 0.98 V |
| Leave Pin 2 floating | Open - no false detection | — | off | 1.17 V |
| Short to GND (Accessory Detected), Initial Attachment | 2 Ohm shorted | 6.5 mA | off | 0 V GND |
| Short to GND (Accy Detected), Steady State | 2 Ohm shorted | — | 36 uA | 0 V GND |

Accordingly, there has been provided an improved approach to accessory detection which provides non-linear operation configured for a low leakage path when exposed contacts are shorted by an electrolytic solution during a detached accessory mode, and linear operation providing a low current path during an accessory attachment mode which shorts out the contacts. Some measured examples of impedance measured across exposed contacts shorted by an electrolytic solution (electrolytic short) are: sea water around 30-50K ohm, saturated salt water (boiled) 30-40K Ohm, and saturated salt water in which electrolysis has taken place 4K-10K Ohm.

Figure 2:
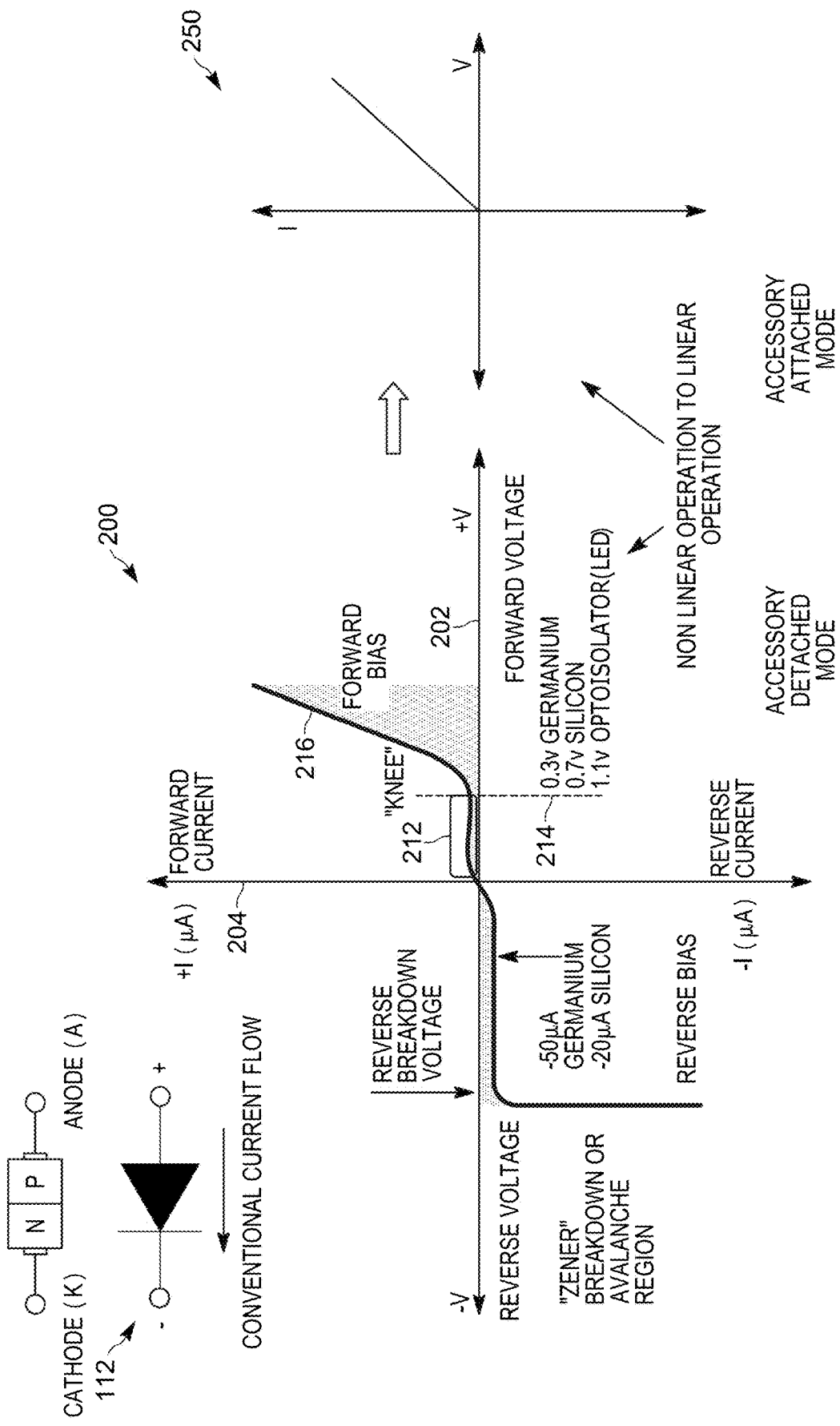
FIG. 2 shows a non-linear voltage-current graph switching to a linear voltage-current graph in accordance with some embodiments.

FIG. 2 shows graphical representations of non-linear operation and linear operation in accordance with some mode embodiments. A voltage-current graph 200 shows an example of non-linear operation with voltage 202 along the horizontal, x-axis and current along the vertical, y-axis. A voltage-current graph 250 shows an example of linear operation. No graph has been provided for idle mode operation in which, as previously discussed, the accessory is detached, the exposed contacts 116, 126 are open, and basically no current is drawn through the diode 112.

Graph 200 is characteristic of a non-linear impedance device, such as the diode 112 of device 110 of FIG. 1 wherein conventional current flows from the anode (p-junction of the diode) to the cathode (n-junction of the diode). Other devices, such as discrete devices comprising but not limited to: an op-amp superdiode, bare small signal or zener diode, field effect transistor (FET), LED, bipolar junction transistor (BJT), along with a discrete sensor incorporated with such devices, may also be used to provide the desired non-linear operation and sensing of such operation. Graph 250 is characteristic of a linear device operation with current flowing through a resistor.

Referring to FIGS. 1 and 2, the diode 112 conducts with minimal low leakage current 212 when operating in a region of forward voltage below a predetermined voltage knee 214 of the non-linear impedance device. The low leakage path runs from DC supply 124 to first resistor (R1) 120 and diode 112 to exposed contacts 116, 126 having electrolytic solution thereon. The current through the diode 112 is insufficient to turn on the sensor 114 of opto-isolator 110, and hence the input port 122 (GPIO 0) remains pulled high by second resistor (R2) 128 and second DC supply 134 thereby indicating to the microprocessor 150 an accessory detached mode. Operating in the low leakage mode prevents corrosion of the contacts and false accessory trigger detections when electrolytic solution is present.

When attachment of the accessory 104 takes place, a short across the first and second exposed contacts 116, 126 of device 102, the current through the diode 112 increases non-linearly 216, operating in a forward voltage region above the voltage knee 214 of graph 200, to the point of turning on the sensor 114 of opto-isolator 110. The voltage drop across the opto-isolator 110 provides a logic level low to the input port (GPIO 0) 122 of microprocessor 150. The logic level low input to the input port (GPIO 0) 122 is indicative of accessory attachment.

The microprocessor 150, in response to detecting accessory attachment, changes the output port (GPIO MUX) 132 to hand over operation for the attached accessory mode to a low current path. The state of the first and second switches 120, 130 is changed wherein first switch (S1) 120 opens and second switch (S1BAR) 130 closes, thereby turning off the opto-isolator 110. The low current path is represented by linear operation shown in graph 250. Current in the accessory attached mode flows through the low current path using linear operation from DC supply 134 through second resistor (R2) 128 to the short to GND across contacts 116, 126.

Hence, the low current path provides linear voltage-to-current operation during an accessory attached mode during which the accessory shorts out the contacts 116, 126. And, the low leakage path provides non-linear voltage-to-current operation during an accessory detached mode in response to contamination occurring across the first and second contacts 116, 126.

Figure 3:
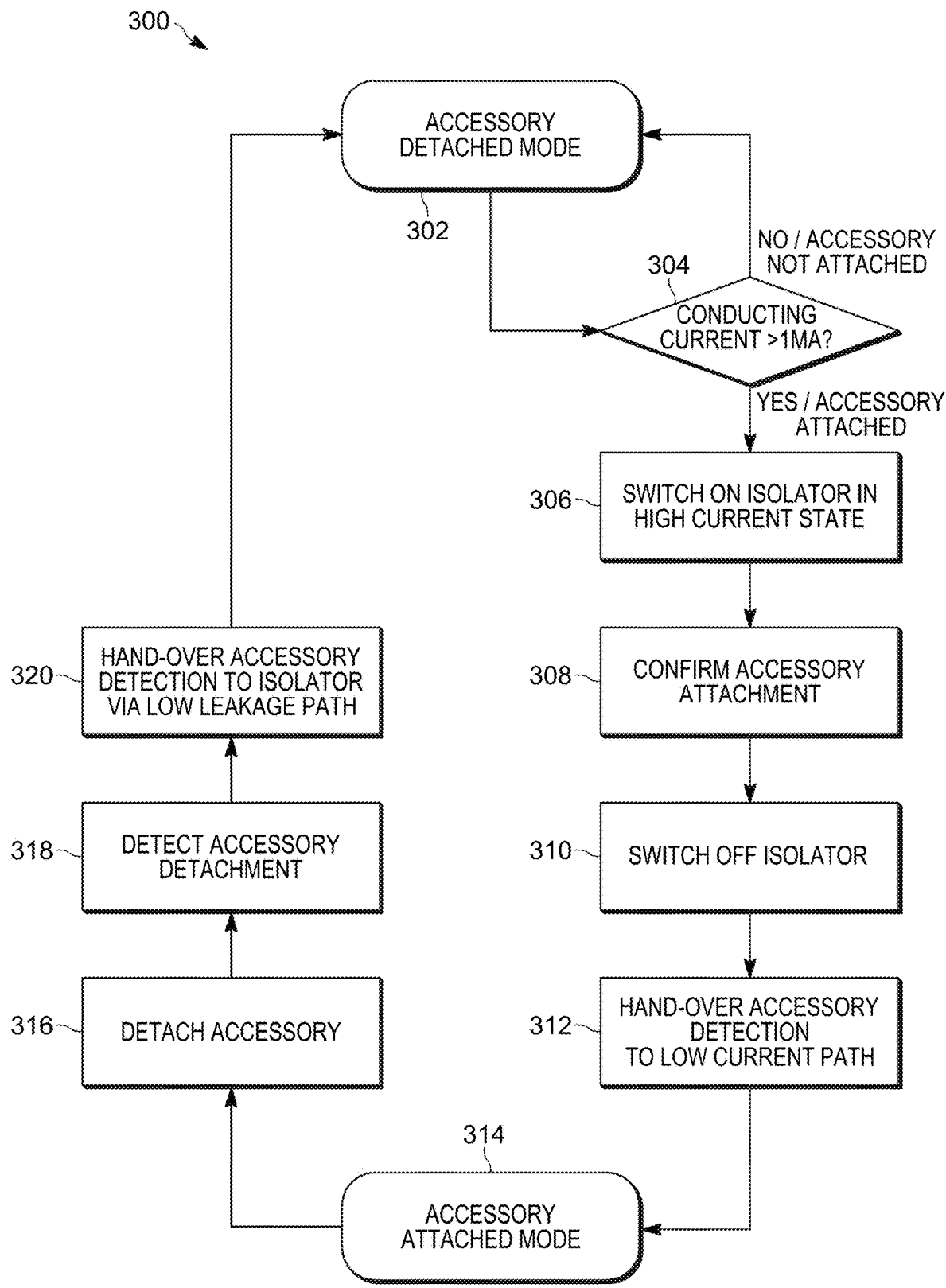
FIG. 3 is flowchart of a method for detecting an accessory at a portable communication device in accordance with some embodiments.

FIG. 3 is flowchart of a method 300 for accessory detection and mitigation of contact corrosion in accordance with some embodiments. Referring to FIGS. 1, 2, and 3, the method begins with the portable communication device having no accessory attached at 302 (idle mode operation). A current measurement is taken at 304 using a non-ohmic measurement approach. The non-ohmic measurement is taken by measuring a voltage drop across a non-linear impedance device, such as the non-linear impedance device 110 described in FIG. 1.

When the current conducted through the non-linear impedance device causes the voltage drop to be below the predetermined voltage knee threshold, the method returns to 302. When the current conducted through the causes the voltage drop to be above the predetermined voltage knee threshold at 304, then accessory attachment is determined, and the non-linear impedance device is switched on in an initial high current state. For example, high current though the diode 112 of FIG. 1 will turn on sensor 114 of non-linear impedance device 110, which causes input port 122 (GPIO 0) of microprocessor 150 to go low.

Confirmation of accessory attachment is detected at 308 causing the non-linear impedance device to be switched off at 310. For example, the accessory detection in FIG. 1 causes output port 132 of microprocessor 150 to switch states, causing the first switch (S1) 120 to switch from a closed state to an open state (turning off non-linear impedance device), and the second switch (S2BAR) 132 to switch from an open state to a closed state (turning on a low current path provided by second DC supply 134 and second resistor 128). While the non-linear impedance device 110 may have high turn-on current, the method advantageously switches over to the low current path at 312 after accessory attachment is detected thereby providing improved power savings. Operation in the accessory attached mode at 314 uses the low current path, and allows for detection of accessory removal to take place using the low current path.

The status of the accessory is now in the attached state at 314, with accessory status being tracked by the low currant path. When the accessory is detached at 316, the detachment is detected at 318. For example, accessory detachment causes the input port 122 of microprocessor 150 of FIG. 1 to go high and the output port 132 to change the states of the first switch 120 to a closed state and the second switch 130 to an open state.

The detection of accessory detachment at 318 triggers a hand-over of accessory detection to the non-linear impedance device via the low leakage path at 320. An example of the low leakage path is the path from DC supply 124, through first pull up resistor 118 and diode 112 of opto-isolator 110 to contact 116. With no accessory attached, pin 2 of the diode 112 floats and no current is drawn. Current is only drawn when an accessory is attached (as described in previous steps) or when an electrolytic solution causes conductance (greater than 0 siemens) between the two proximately located contacts 116, 126, also referred to as an electrolytic short. The low leakage path through the first resistor 118 and diode 112 are sufficiently low to prevent corrosion on the contacts and false triggers of accessory attachment. The method returns to 302.

Figure 4A:
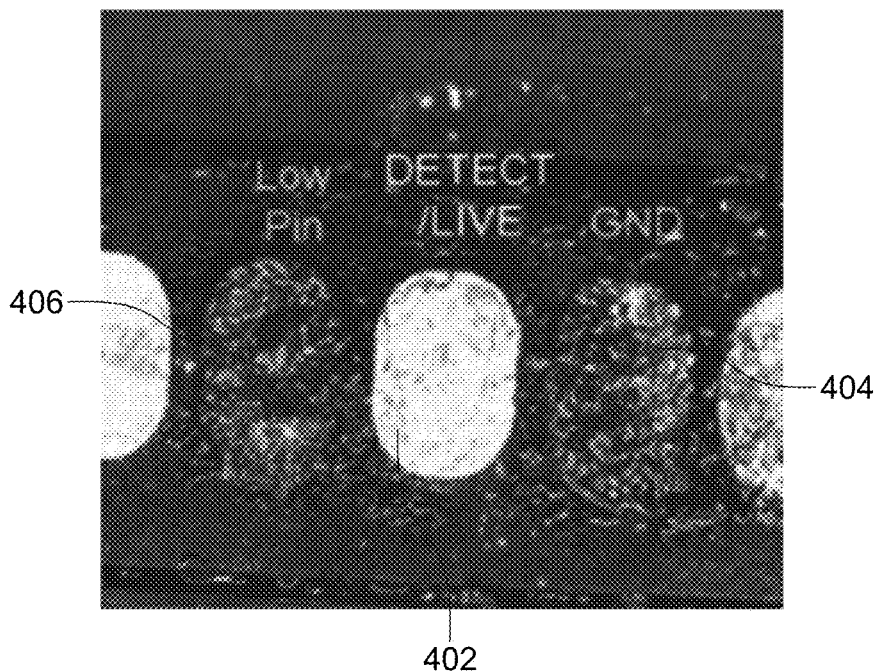
FIGS. 4A and 4B provide a comparison of interface contacts of a portable communication device without corrosion mitigation and with corrosion mitigation in accordance with some embodiments.
Figure 4B:
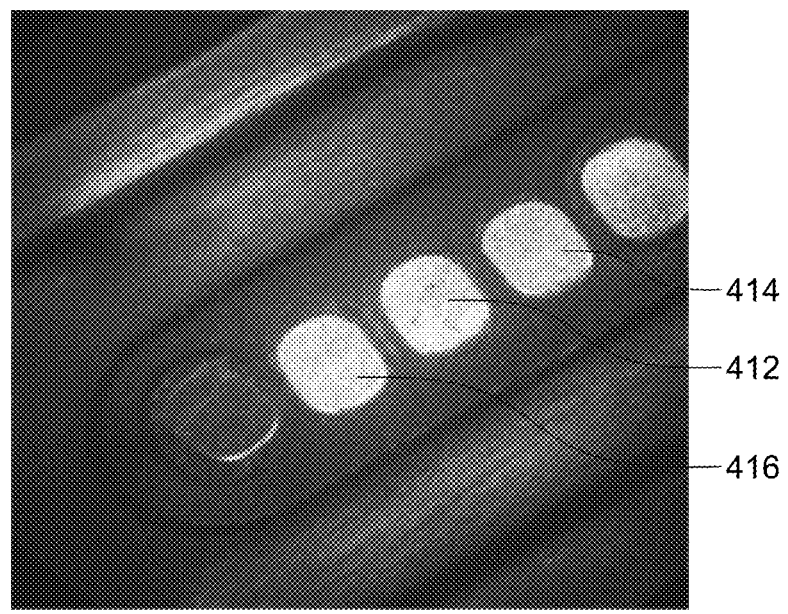

FIGS. 4A and 4B provide a comparison of interface contacts of a portable communication device without corrosion mitigation (FIG. 4A) and with corrosion mitigation (FIG. 4B) in accordance with some embodiments. FIG. 4A shows a live voltage contact 402 adjacent to two low voltage potential contacts, shown as GND contact 404 and low voltage contact 406. Corrosion residue was observed on both contacts 404, 406 adjacent to the live contact 402 when exposed to salt water conditions. The live contact 402, in this example, is a detect contact of a portable radio for detecting the attachment and detachment of an accessory (not shown). The photo shows how the migration of ions from the live contact 402 to adjacent low voltage contacts 404, 406 forms a residue on those adjacent contacts, and this residue causes corrosion of the contacts. While some of the residue can be wiped off, corrosion in the form of exposed copper and dull contacts can lead to unreliable interface connections.

FIG. 4B shows interface contacts of a portable communication device with corrosion mitigation in accordance with some embodiments. FIG. 4B shows a live voltage contact 412 adjacent to two low voltage potential contacts, shown as GND contact 414 and low voltage contact 416. In this view, any minimal corrosion residue has been easily wiped off, revealing shiny, non-corroded contacts. In accordance with the embodiments, the reduced current across the adjacent exposed contacts minimizes migration of ions thereby minimizing the formation of residue and preventing contact corrosion.

Figure 5:
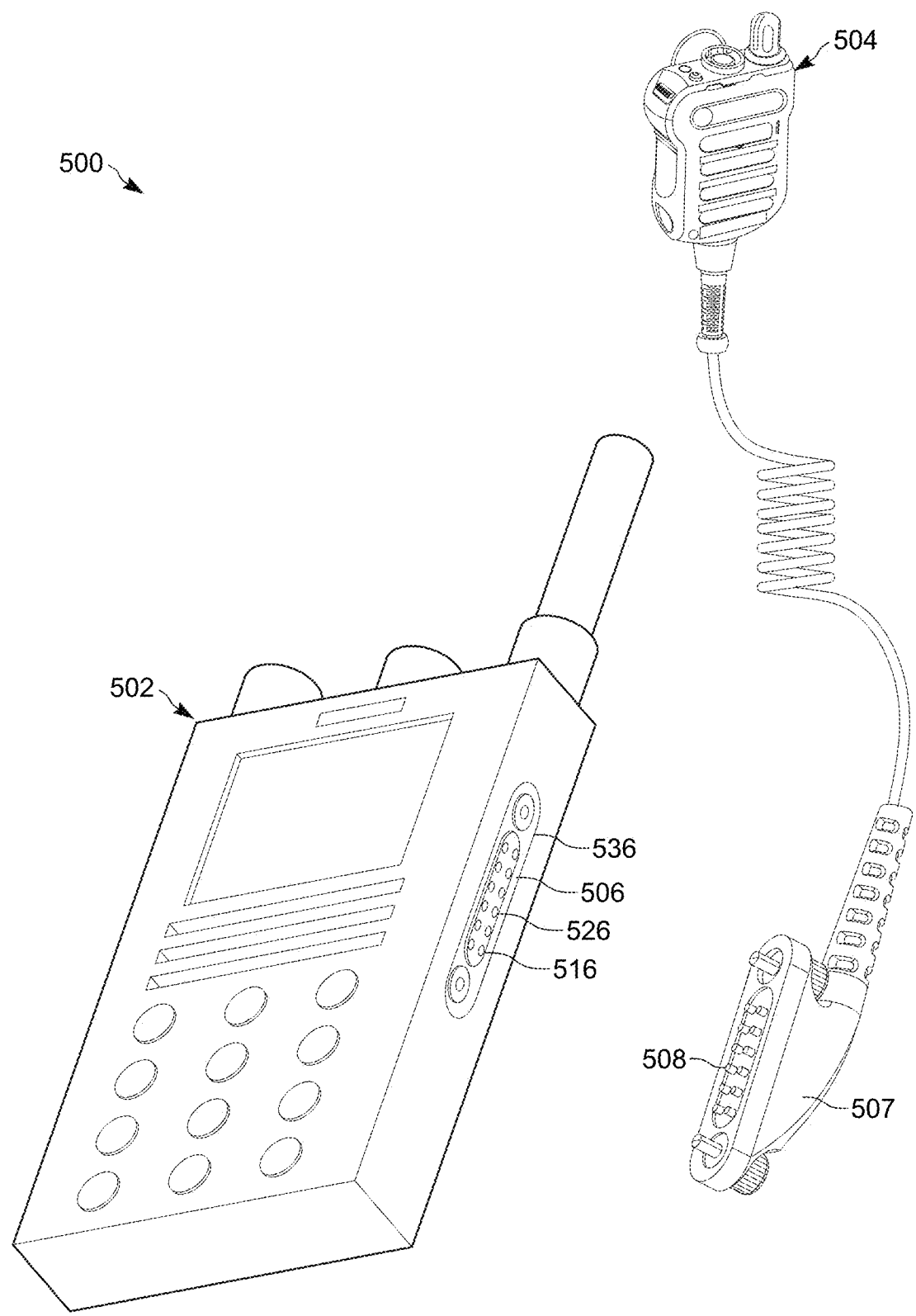
FIG. 5 is a portable communication system in which a portable battery operated communication device provides an interface for an accessory accordance with some embodiments.

FIG. 5 is a portable communication system 500 in which a portable battery operated communication device 502 provides a device interface 506 for an accessory 504 in accordance with some embodiments. The device interface 506 comprises a plurality of exposed contacts 536 disposed upon an exterior surface of the portable battery operated communication device 502. The device interface 506 comprises at least first and second exposed contacts 516, 526, wherein one contact is a positive voltage contact (a live contact) and the other contact is a GND contact or other low voltage contact. These contacts may or may not be adjacent contacts but do form part of the same interface interconnect for mating with the accessory 504.

The device interface contacts may be flat metal contacts or other suitable contact for mating with corresponding pins of the accessory 504. The accessory 504 may couple to the device 502 via an accessory interconnect, depicted in FIG. 5 as a wired cabled connector 507 comprising a plurality of accessory pins 508. The accessory pins 508 may be, for example, pogo pins, or other suitable pin or contact for mating with the device interface contacts 506. The connector 507 may comprise a screw type mount, snap fit mount, or other interconnect means for coupling the connector to the device housing such that accessory pins 508 align and mate with the plurality of device interface contacts 506. While the accessory 504 is depicted as a remote speaker microphone (RSM), it is appreciated that other cabled or non-cabled and/or other direct contact-to-contact type accessory interconnects may also couple to the improved device interface 506.

When the accessory 504 is detached from the portable battery operated communication device 502, the plurality of exposed contacts 536 may be exposed to environmental conditions, such as an electrolytic solution bridging contacts 516, 526. In the past, an electrolytic solution bridging contacts could have resulted in contact corrosion and false triggers of accessory detection. However, by advantageously incorporating the interface detection approach of the embodiments, corrosion and false triggering have been prevented at device interface 506.

In accordance with some embodiments, the positive voltage contact 516 and GND contact 526 are electrically coupled to electronic circuitry located within the portable communication device 502, as was described in the previous figures. In accordance with the embodiments, the improved device interface 506 not only detects accessory attachment and detachment but minimizes corrosion of the exposed contacts of device interface 506 that might otherwise result in false accessory detection triggers. In accordance with the embodiments, the live contact 516 and the GND contact 526 are electrically coupled to the electronic circuitry described in accordance with the previous embodiments.

As was previously described, the electronic circuitry of portable battery operated communication device 502 comprises switching circuitry, under microprocessor control, wherein the switching circuitry operatively controls both: non-linear operation providing a low leakage path when exposed contacts 516, 526 are shorted by an electrolytic solution during a detached accessory mode, and linear operation providing a low current path during an accessory attachment mode which shorts the positive voltage contact 516 to GND contact 526.

In accordance with the embodiments, the electronic circuitry of portable battery operated communication device 502 is configured, as previously described, for switching between a low current path during accessory attachment and a low leakage path during non-accessory attachment, where the contacts have been exposed to an electrolytic solution. In accordance with the embodiments, the low current path provides a linear voltage-to-current operation during an accessory attached mode during which the accessory shorts out the first and second contacts 516, 526 contacts. In accordance with the embodiments, the low leakage path provides non-linear voltage-to-current operation during an accessory detached mode in response to contamination occurring across the first and second contacts 516, 526 forming a high impedance path between the positive voltage contact and the GND contact.

Accordingly, there has been provided an improved approach to controlling an interface of a portable communication device. Contact corrosion and false accessory triggers have been prevented through the use of a non-linear impedance device that provides accessory detection and which further serves as a low leakage path during eletrolytic short across contacts. The use of high resistance pull-up resistors, which can cause false detection under moisture conditions, has been avoided. The approaches provided by the embodiments have further avoided the use of mechanical dust covers which are inconvenient and tend to be misplaced. The approaches provided by the embodiments avoid display menu configuration which are again time inefficient and costly.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable battery operated communication device, comprising:
    first and second exposed contacts, one contact being a live contact and another contact being a GND contact;
    a microprocessor providing an input port and an output port;
    a non-linear impedance device and sensor operatively coupled between the live contact and the input port;
    first and second switches coupled to the output port of the microprocessor, the first and second switches selectively enable:
        a low current path when the first and second exposed contacts are shorted to GND by an accessory, wherein the non-linear impedance device is switched on with a high turn-on current upon initial attachment of the accessory thereby, generating a voltage drop at the non-linear impedance device indicative of accessory attachment at the input port to the microprocessor; and
        wherein the non-linear impedance device is switched off after a predetermined time, and the low current path is switched on for linear operation during an accessory attachment mode; and
    a low leakage path when the first and second exposed contacts are shorted by an electrolytic solution.

2. The portable battery operated communication device of claim 1, wherein the non-linear impedance device and sensor comprise one of:
    an integrated opto-isolator;
    a discrete transistor and sensor;
    a discrete diode and sensor;
    a discrete LED and sensor.

3. The portable battery operated communication device of claim 1, wherein the low leakage path operates in a non-linear mode.

4. The portable battery operated communication device of claim 1, wherein the low leakage path is formed of a first pull-up resistor switchably coupled to the non-linear impedance device.

5. The portable battery operated communication device of claim 1, wherein the low current path operates in a linear mode.

6. The portable battery operated communication device of claim 1, wherein the low current path is formed of a second pull-up resistor switchably coupled to the live contact.

7. The portable battery operated communication device of claim 1, wherein the non-linear impedance device turns on with a current that provides a forward voltage above a predetermined voltage knee threshold of a non-linear voltage-current curve.

8. The portable battery operated communication device of claim 1, wherein the low leakage path is controlled by the non-linear impedance device operating in a region of forward voltage, wherein the forward voltage is less than a predetermined voltage knee for the non-linear impedance device.

9. A method for controlling an interface of a portable communication device, comprising:
    providing an input port and an output port of a microprocessor;
    measuring current at a non-linear impedance device operatively coupled to a live contact of the interface; and
    operating the interface in a non-linear mode using a low leakage path of the non-linear impedance device in response to the live contact and a GND contact of the interface being shorted by an electrolytic solution; and
    operating the interface in a linear mode using a low current path when the live contact and the GND contact are shorted to GND by an accessory, by:
        switching on the non-linear impedance device to generate a voltage drop at the non-linear impedance device indicative of accessory attachment at the input port to the microprocessor; and
        switching off the non-linear impedance device after a predetermined time, and switching on the low current path for linear operation during an accessory attachment mode.

10. The method of claim 9, further comprising:
    operating the interface in an idle mode, without current, when the live contact and the GND contact are open.

11. The method of claim 9, wherein the low leakage path is controlled by the non-linear impedance device operating in a region of forward voltage, wherein the forward voltage is less than a predetermined voltage knee for the non-linear impedance device.

12. A communication system, comprising:
a portable battery operated communication device comprising a microprocessor providing an input port and an output port;
a device interface formed of a plurality of exposed device contacts disposed upon an exterior surface of the portable battery operated communication device, the plurality of exposed device contacts providing at least first and second exposed contacts providing a live voltage contact and a GND contact, the live voltage contact and the GND contact being electrically coupled to electronic circuitry within the portable battery operated communication device;
an accessory comprising an accessory interconnect, the accessory interconnect comprising a plurality of accessory pins, the accessory pins for aligning and mating with the exposed device contacts of the device interface; and
wherein the electronic circuitry of the portable battery operated communication device comprises a non-linear impedance device operatively coupled to switching circuitry, the live voltage contact and the GND contact, the electronic circuitry configured for switching between:
a low current path and linear voltage-to-current operation during an accessory attached mode during which the accessory shorts out the live voltage contact and the GND contact, wherein the non-linear impedance device is switched on generating a voltage drop at the non-linear impedance device indicative of accessory attachment at the input port to the microprocessor, and wherein the non-linear impedance device is switched off after a predetermined time, and the low current path is switched on for linear operation during an accessory attachment mode; and
a low leakage path and non-linear voltage-to-current operation during an accessory detached mode in response to contamination occurring across the first and second contacts.

13. The communication system of claim 12, wherein the low leakage path is controlled by the non-linear impedance device operating in a region of forward voltage, wherein the region of forward voltage is below a predetermined voltage knee for the non-linear impedance device.

14. The communication system of claim 12, wherein accessory detection is controlled by the non-linear impedance device operating in a region of forward voltage, wherein the forward voltage is above a predetermined voltage knee for the non-linear impedance device.

15. The communication system of claim 12, wherein accessory detection remains enabled at the portable battery operated communication device subsequent to accessory detachment.

16. The communication system of claim 12, wherein the accessory contacts are part of a cabled connector.

17. The communication system of claim 16, wherein the cabled connector is a global communications accessory interface (GCAI) connector.

\* \* \* \* \*